United States Patent Office 3,510,090
Patented May 5, 1970

3,510,090
AUTOMATIC ALTITUDE CONTROL APPARATUS
FOR AIRCRAFT
Victor L. Falkner, Forest Lake, and Gordon C. Kafer, Minneapolis, Minn., assignors to Honeywell Inc., Minneapolis, Minn., a corporation of Delaware
Filed Sept. 8, 1967, Ser. No. 666,375
Int. Cl. B64c 13/18
U.S. Cl. 244—77          9 Claims

ABSTRACT OF THE DISCLOSURE

To maintain a constant altitude during rapid airspeed changes, rapid changes in aircraft trim angle of attack are required. Gain limitations of a conventional altitude hold control limit the range of airspeed disturbance over which a relatively constant altitude will be maintained. Airspeed information from the air data computer can be used to improve the performance of a conventional altitude hold control during rapid airspeed changes. The relationship between angle of attack change required for an airspeed change is obtained from the relationship existing between trim angle of attack and indicated airspeed or Mach number. The slope of this curve, change in angle of attack $\alpha$ per change in airspeed at a given airspeed establishes the relationship required to effect the change of attitude reference. The rate of airspeed reference change required for a given rate of airspeed change is obtained by high passing the airspeed signal to obtain the rate of change of airspeed.

---

This invention relates to condition control apparatus such as an automatic trim adjuster for aircraft which apparatus is adapted to alter the trim angle of attack of a craft during changes in airspeeds thereof, such as due to increase in thrust of the engines, to maintain an aircraft or dirigible craft at constant altitude during such airspeed changes.

It is an object of this invention to automatically effect a change in a third condition such as pitch attitude of an aircraft (from a reference value required for one $g$, steady flight) during changes in a second condition such as airspeed to maintain a first condition such as constant altitude.

It is a further object of this invention to bias the attitude reference as the trim angle of attack of the aircraft is required to change during changes in airspeed or first condition, to maintain constant altitude.

It is a further object of this invention to provide an improved automatic altitude control for an aircraft through the addition of relatively few components to the elevator control channel to enable such automatic pilot to maintain constant altitude.

DESCRIPTION

The above and other objects of the invention and the manner in which the objectives and advantages are obtained will be better understood from the following description of a preferred embodiment thereof taken in connection with the accompanying drawing wherein.

The novel apparatus has been applied to the pitch axis control of an aircraft or member wherein conventional attitude hold or third condition control is provided through pitch attitude or third condition sensors and pitch rate and normal acceleration sensors. The apparatus features a control operative during the altitude or second condition control mode wherein for changes in airspeed or first condition of the craft as by change in power a change in the trim angle of attack of the aircraft or third condition for one $g$ flight is provided thereby preventing change in altitude or second condition despite changes in airspeed or first condition.

Figure 1:
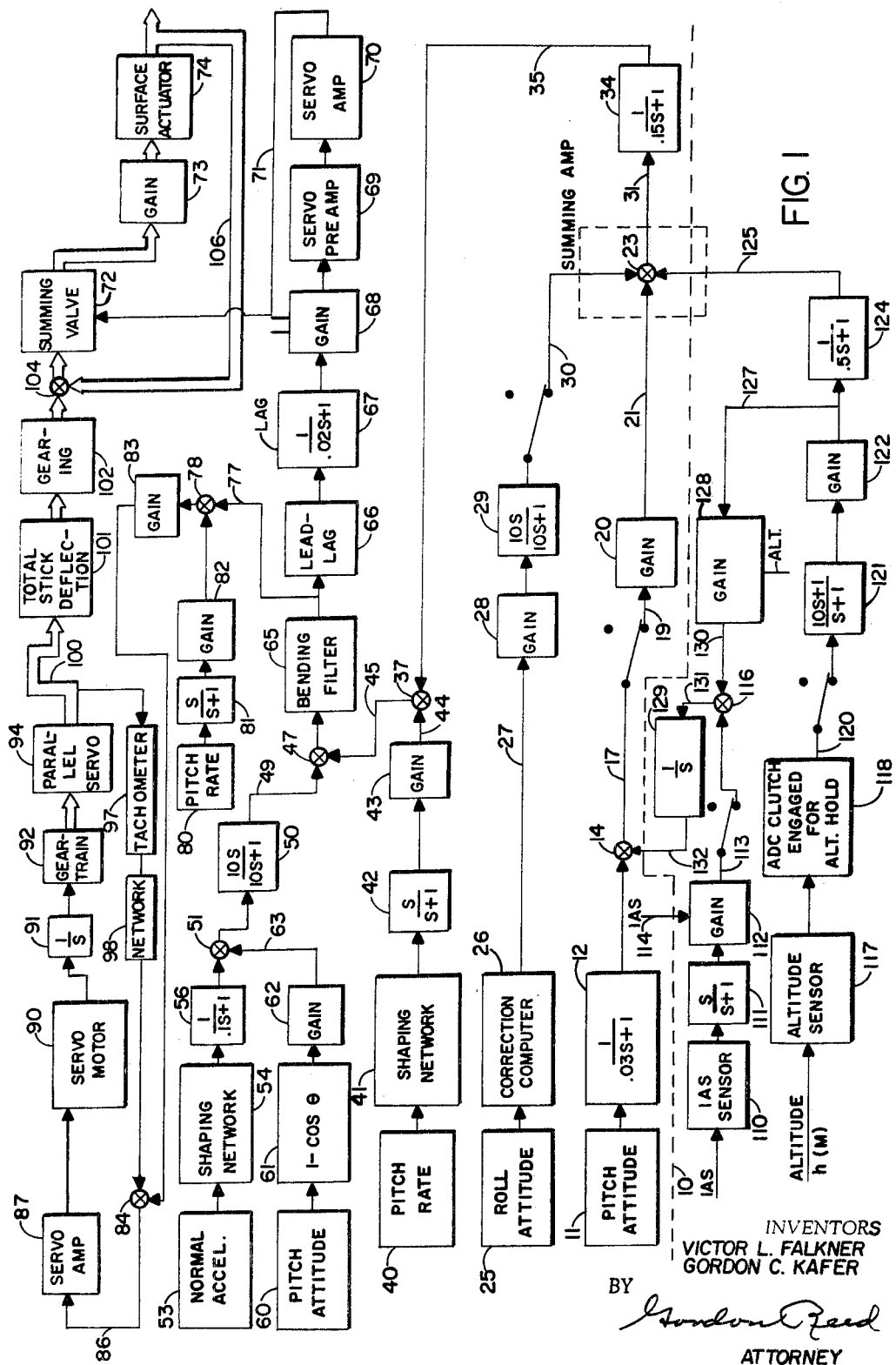
FIG. 1 is a block diagram of the novel altitude control apparatus.

Referring to FIG. 1, the portions of the apparatus provided for maintaining the attitude of the craft or third condition of the member, disassociated from altitude control of the craft, are shown above the dashed line.

In FIG. 1 and above the dashed line 10 and pertaining to the attitude control function for a dirigible craft there is provided a pitch attitude sensor 11, such as a displacement gyro, that provides a signal in accordance with the magnitude and direction of change in craft attitude from a desired attitude. The signal therefrom is supplied through a shaping network 12 to a signal summing device 14 having the output therefrom transmitted over conductor 17, conductor 19 to gain device 20 and the output therefrom is transmitted by conductor 21 to a second signal summing device 23. A second input to the summing device 23 is provided from a craft roll attitude sensor 25 which may be a horizon gyro sensing craft roll attitude with respect to a datum and providing a signal to a correction computer 26 which thus provides a corrective signal to the pitch attitude changing means to prevent loss of altitude during a banked turn of the craft. The signal from the computer 26 is transmitted by conductor 27, gain device 28, shaping network 29, conductor 30 to summing device 23. The output from signal summing device 23 via conductor 31 is applied to lag device 34 having its output conducted by signal transmitting means 35 to a third signal summing device 37.

A second input to the summing device 37 is provided by a pitch rate sensor 40 such as a conventional rate gyro that provides a signal in accordance with the direction and magnitude of the angular rate of change of the craft about its pitch axis. The output from sensor 40 is supplied to a shaping network 41 representative of the gyro response to pitch rate and network 41 has its output supplied through a second shaping network 42, gain device 43, conductor 44 to summing device 37. The output from summing device 37 is transmitted by conductor 45 to fourth summing device 47. A second signal is applied to summing device 47 via a conductor 49. Conductor 49 transmits the output from a shaping network 50 having inputs thereto derived from a fifth signal summing device 51. The inputs to summing device 51 are supplied in one case by an accelerometer 53 responsive to accelerations of the craft along its $z$ axis and supplying signal through shaping network 54, which represents the transfer function of the accelerometer, and lag device 56 to the summing device 51. The second input to summing device 51 is provided by a pitch attitude device 60 sensing the craft attitude, $\theta$, with respect to a datum and supplying its output signal through a computer 61, gain device 62 and conductor 63 to summing device 51. The signal from the pitch attitude sensor and computer will compensate the signal from the normal accelerometer due to change in pitch attitude of the craft from level flight.

Reverting to fourth summing device 47, the output therefrom is transmitted in one case through bending filter 65, lead-lag shaping network 66, lag device 67, gain device 68, to a servo preamp 69 having its output supplied to the servo amplifier 70. The output from servo amplifier 70 is supplied over conductor 71 to a valve 72 connected with a mechanical and electrical summing device 104 to position a summing valve 72 which through the gain device 73 ports oil for the control of the craft control surface actuator 74. The control surface may be an elevon which is a control surface that provides a control, for one of its operations, in accordance with that supplied by the conventional elevator of an aircraft to change pitch attitude.

The output from craft body bending filter 65 is also supplied over conductor 77 to summing device 78 where it is summed with a high passed pitch rate signal supplied by a pitch rate sensor 80 having its output supplied through a high passed network 81 and gain device 82 to a sixth summing device 78. The output from sixth signal summing device 78 is supplied through gain device 83 to a seventh signal summing device 84 having the output thereof transmitted by conductor 86 to servo amplifier 87. The amplifier 87 controls an electrical servomotor 90, 91 which in turn drives a gain device such as a gear train or mechanical gearing 92 that controls a parallel servo actuator-arrangement 94. The summing device 84 also receives a feedback signal in the form of a servo rate signal through tachometer 97 and network 98. A mechanical output of the servo actuator 94 due to the servo drive is transmitted by a mechanical connection 100 which is tied in with the primary or manual control system for the control surface of the craft so that operation of the mechanical means 100 moves the manual control column of the craft. The control column or control stick deflection is supplied through the stick deflection mechanism 101, mechanical gearing 102 and through a mechanical force summing device 104 to position the control valve 72 having mechanical and electrical inputs. The operation of the actuator 74 is supplied through a mechanical force feedback arrangement 106 to the summing device 104.

It is old in the art to have a valve such as summing valve 72 with mechanical force inputs as from the control column movement and also electrical force or torque inputs from a torquer connected to conductor 71. In the operation of the actuator 74, since the electrical servo 90 operates with a rate feedback the resulting operation of actuator 74 is a proportional plus integral with the proportional effect being provided by the energization of the torquer for valves 72 from conductor 71 and the integral control being provided by the operation of motor 90.

The pitch attitude control apparatus thus far described and which is arranged above the dashed line 10 of FIG. 1 is old. The invention herein is primarily concerned with the altitude control apparatus shown below the dashed line 10 in FIG. 1 which operates through the attitude control apparatus to control craft altitude.

The altitude control or second condition apparatus comprises an indicated airspeed sensor 110. Sensor 110 supplies an electrical signal I.A.S. to a high pass filter 111, and high passed network 111 supplies its output to a gain device 112 scheduled in accordance with I.A.S., to compute the rate of change of angle of attack having an output supplied to conductor 113.

It will be recalled that it is an object to change the attitude of the craft or its angle of attack when there is a change in forward airspeed of the craft either positive or negative to prevent change in altitude or second condition of the craft. The output of the high passed network 111 is the rate of change in airspeed of the craft.

Figure 2:
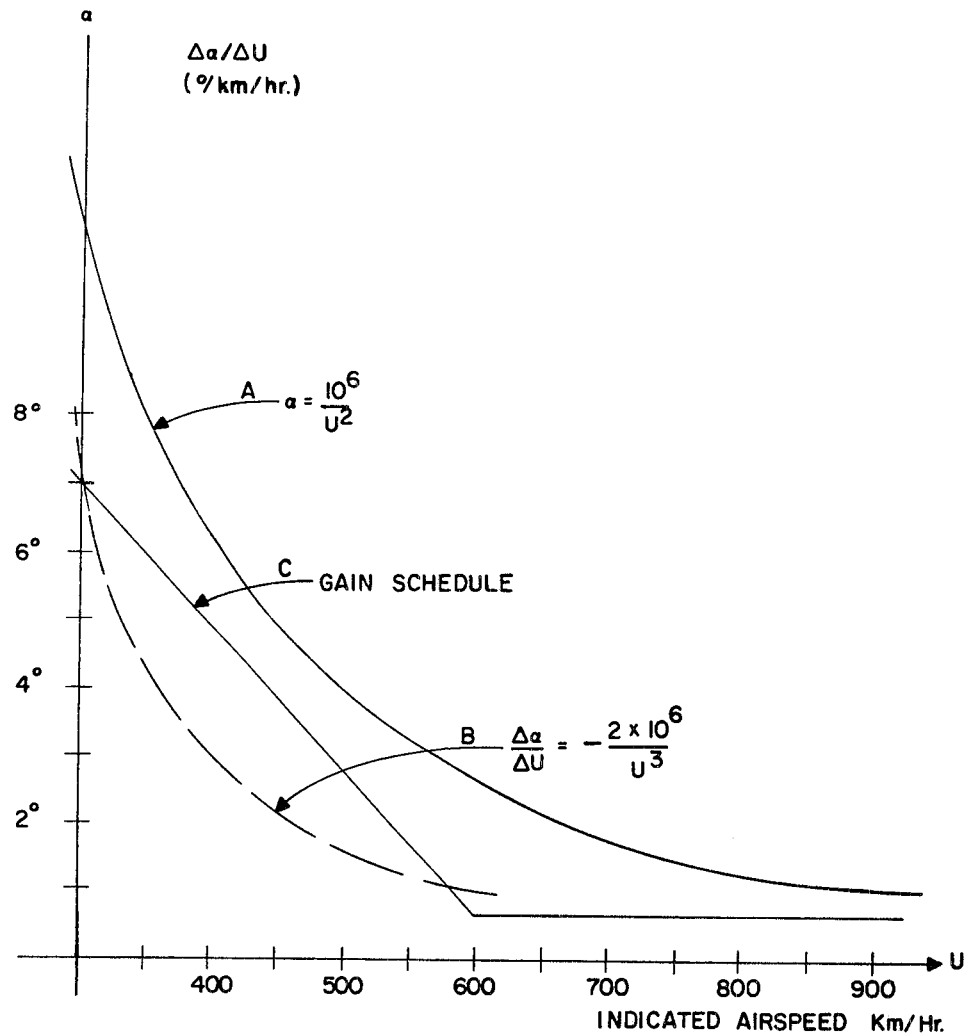
FIG. 2 is a graph showing the basis of providing the gain adjustment and the change in trim angle of attack for increases in airspeed.

FIG. 2 (to be described hereinafter) shows a relationship between airspeed of the craft and angle of attack required to maintain a load factor of one $g$ or maintain constant altitude. Thus, knowing the change in airspeed as supplied to gain 112 FIG. 1 and knowing the airspeed at which this change occurs which schedules or varies the gain of device 112 the change in angle of attack or change in attitude of the craft required to prevent change in altitude may be readily computed. For this purpose again, the change in airspeed is supplied as an input to gain device 112 which gain device in turn is adjusted by adjustng means 114 in accordance with indicated airspeed of the craft. The output from the gain device 112 on conductor 113 is thus the required rate of change in angle of attack or attitude to maintain the load factor of one or constant altitude. The output from gain device 112 is supplied through conductor 113 to signal summing device 116.

Leaving summing device 116 for the moment, the altitude control also includes an altitude error sensing device consisting of an altitude responsive device 117 and a clutch 118 which transmits the electrical output from sensor 117 to a conductor 120. The altitude error providing means is old and well-known in the art wherein when the craft is at a desired altitude the clutch 118 is energized so that subsequent changes in altitude from that desired or existing when the clutch was energized are transmitted to conductor 120. The altitude error signal on conductor 120 is supplied through network 121, which is a lead-lag network, gain device 122, lag device 124, conductor 125 to second summing arrangement 23. The output from gain device 122 is also supplied by conductor 127 to gain device 128 which is scheduled in accordance with craft altitude. The output from gain device 128 is supplied by conductor 130 to the summing arrangement 116. The output from summing arrangement 116 is supplied by conductor 131 to an integrator 129.

By means of the integrator 129, there is obtained as its output a total required change in attitude or angle of attack required for the total change in indicated airspeed over the interval involved, which will bias in summing device 14 the pitch attitude signal. In other words the integrator 129 integrates the instantaneous change in angle of attack or instantaneous change in attitude required over the period involved.

Additionally the integrator 129 integrates the altitude error from the desired altitude on conductor 130 so that the craft is automatically maintained at the altitude necessary for one $g$ trimmed flight by the integral effect on the altitude error signal on conductor 120.

The output signal on conductor 113 and its integration through integrator 129 provides what may be termed "quickened" corrective effect on the altitude control system to reduce any lag in the constant altitude system operation Thus it functions to oppose change in altitude during change in airspeed of the craft.

The alternative output from the altitude error sensor on conductor 120 to maintain altitude constant and which is supplied to network 124 supplies a conventional proportional control through conductor 125 to summing device 23.

FIG. 2 is a graph having as absicissae craft indicated airspeed, I.A.S., and angle of attack, $\alpha$, as ordinates. Curve A shows the relationship for constant altitude flight between the angle of attack and airspeed. Curve B is the tangent curve relating changes in angle of attack to changes in airspeed. In other words the slope of curve A, that is, change in alpha or angle of attack per change in airspeed. I.A.S., establishes the relationship required to effect a change of attitude reference as a function of the forward accelerated maneuver or change in airspeed of the craft as from power change.

While the gain device 112 may be characterized so that for a particular indicated airspeed and a given change in indicated airspeed as inputs thereto a computed change in angle of attack, following curve B, may be provided, alternatively a change in angle of attack for a particular change in airspeed relationship to bias pitch attitude sensor 11 may also be approximated by a linear schedule (curve C) with a break point at 600 km./hr., I.A.S.

Summarizing altitude control is provided by a quickening signal consisting of a high-passed airspeed signal, the high passed network having a one second time constant, scheduling the high passed airspeed signal as a function of indicated airspeed and supplying the scheduled signal to an integrator. This quickening signal is supplemented by an integral signal or reset signal provided by integrating the altitude error signal. Additionally, the altitude control is supplemented by conventional altitude error signal.

OPERATION

In operation, with the aircraft in flight it is maneuvered until it attains a desired altitude at which time the clutch 118 is energized. Thereafter any departures of the craft from the selected altitude results in an altitude error signal in conductor 120. This signal is supplied in one case through the integrator 129 to summing device 14 and in another case through conductor 125 to summing device 23 which has its output supplied to the attitude changing means such as an elevon actuator of the craft.

If there be changes in indicated airspeed such as due to increase in power, sensed by the indicated airspeed sensor 110, a signal is provided on conductor 113 from computer 112 corresponding with the rate of change of angle of attack required for instantaneous changes in indicated airspeed. This signal on conductor 113 is integrated by integrator 129 to provide the change in craft angle of attack or pitch attitude to hold constant altitude during the total change in indicated airspeed for the period considered. Provisions may be included in the airspeed sensor so that only changes in the indicated airspeed above a desired airspeed are provided to the high passed network 111.

It will now be apparent that there has been provided novel apparatus for improvement in performance of the altitude hold mode of the craft during accelerated flight causing changes in forward airspeed of the craft which improvement is obtained by adding a high passed airspeed signal through a scheduled gain device and integrator to the altitude control loop which also receives integrated altitude error and proportional error signals. Thus, an attitude change is obtained for the aircraft to achieve constant alititude flight during airspeed changes which in effect will adjust or bias the attitude reference as the trim angle of the craft changes during changes in airspeed.

Although a particular embodiment of the invention has been described in detail herein, it is now evident that many variations may be devised within the spirit and scope thereof and the following claims are intended to include such variations.

What is claimed is:

1. In condition control apparatus for a member supported in a fluid and linearly and angularly moveable therein and having a member first condition such as linear movement operable changing means, a member first condition such as speed through the fluid incremental change sensor, a member second condition such as altitude change sensor, a sensor means responsive to change in a third condition such as angular position of the member all sensors providing signals, and a member third condition such as angular position operable changing means, in combination therewith:

computing means responsive to the signal from the first condition sensor for converting said member first condition incremental change signal to a signal related to the incremental of change in the member third condition sensor datum required to oppose change in said member second condition due to an incremental change in the member first condition; and means controlling the third condition changing means from the three signals from the second condition sensing means, from the sensor means responsive to change in the third condition of the member, and from the computing means.

2. The apparatus of claim 1, and means for also supplying the second sensor error signal to an integrator means to control the third condition changing means.

3. The apparatus of claim 1, wherein the first condition is indicated airspeed of an aircraft, the second condition is the altitude of the craft, the third condition is the attitude of the craft, and the member is an aircraft, wherein the converted airspeed signal is in accordance with the required change in angle of attack or attitude of the craft.

4. The apparatus of claim 3, wherein the converting means includes a rate of change means and an integrator and means for supplying the output of the rate of change means to said integrator to provide the required change in attitude bias.

5. The apparatus of claim 2 and means modifying the first sensor signal to a change in the first condition signal prior to conversion thereof.

6. The apparatus of claim 1, and gain means responsive to the first condition for additionally adjusting the converting means.

7. The apparatus of claim 6 and means for additionally controlling the third condition changing means in accordance with the second condition sensor.

8. The apparatus of claim 7 and means for additionally controlling an integrator from the second condition error sensor to additionally control the third condition changing means.

9. The apparatus of claim 8 characterized by the member is an aircraft, and the first, second, and third conditions are respectively airspeed, altitude and attitude of the craft and means for modifying the altitude error signal to the integrator in accordance with the altitude of the craft.

References Cited

UNITED STATES PATENTS

| 2,790,946 | 4/1957 | Yates | 244—77 |
| 3,119,582 | 1/1964 | Kaufmann | 224—77 |
| 3,275,269 | 9/1966 | Yiotis | 224—77 |

FERGUS S. MIDDLETON, Primary Examiner